United States Patent [19]
Leino et al.

[11] Patent Number: 4,989,306
[45] Date of Patent: * Feb. 5, 1991

[54] ROLL FOR DIRECTLY CONTACTING A WEB

[75] Inventors: Jorma Leino; Jukka Salo; Veijo Miihkinen; Ari Talama, all of Jyväskylä, Finland

[73] Assignee: Valmet Paper Machinery Inc., Finland

[*] Notice: The portion of the term of this patent subsequent to Aug. 15, 2006 has been disclaimed.

[21] Appl. No.: 345,353

[22] Filed: Apr. 28, 1989

[30] Foreign Application Priority Data

Apr. 28, 1988 [FI] Finland .................................. 882006

[51] Int. Cl.$^5$ .............................................. B21B 31/08
[52] U.S. Cl. ................................................ 29/132
[58] Field of Search .................................... 29/132

[56] References Cited

U.S. PATENT DOCUMENTS

| | | | |
|---|---|---|---|
| 4,548,653 | 10/1985 | Bocquet et al. | 29/132 X |
| 4,697,320 | 10/1987 | Ishihara et al. | 29/132 |
| 4,727,740 | 3/1988 | Yabuki et al. | 29/132 X |
| 4,748,736 | 6/1988 | Miihkinen | 29/132 X |
| 4,793,041 | 12/1988 | Jenkins et al. | 29/132 X |
| 4,794,680 | 1/1989 | Meyerhoff et al. | 29/132 |
| 4,796,342 | 1/1989 | Miihkinen | 29/132 |
| 4,839,949 | 6/1989 | Sobue et al. | 29/132 |
| 4,856,161 | 8/1989 | Miihkinen | 29/132 X |

Primary Examiner—Mark Rosenbaum
Assistant Examiner—Frances Chin
Attorney, Agent, or Firm—Steinberg & Raskin

[57] ABSTRACT

The present invention concerns a roll used in the manufacture of paper, for example a central roll in a press or a calender roll, with which the web is in direct contact and from which the web is detached. A coating has been formed onto a cylinder mantle of the roll, the coating being partly made of metal and also including a ceramic material. An outer face of the coating is formed of carbide-rich areas and of matrix areas placed between the carbide-rich areas. The present invention also concerns a method for manufacturing such a roll.

16 Claims, 1 Drawing Sheet

ROLL FOR DIRECTLY CONTACTING A WEB

BACKGROUND OF THE INVENTION

The present invention concerns a roll used in the manufacture of paper, for example a center roll in a press or a calender roll, with which the web is in direct contact and from which the web is detached. A coating has been formed onto a cylinder mantle of this roll. This coating is partly made of metal and also includes a ceramic material.

The present invention also concerns a method for the manufacture of a roll thereof.

As is well-known, in a press section of a paper machine, a rock roll is used which is made of granite. The popularity of granite is based upon its surface properties, which provide a controlled detaching of the paper web from the rock face. Moreover, granite withstands the wearing effect of a doctor as well.

However, granite has certain drawbacks. Being a natural material, its properties vary, and internal flaws in granite and its tendency to crack constitute a serious obstacle to its use in certain applications. Moreover, a granite roll is heavy, which increases the tendency of vibration of the structures. The weight of the rock roll is also reflected in the dimensioning of lifting equipment and of foundations of the paper machine.

Synthetic rock rolls are also known in the prior art, which are principally polymer-faced rolls in which rock powder such as quartz sand, has been added among hard rubber or polyurethane. Drawbacks of these rolls have been excessive adherence of the paper web to the roll face, as well as poor mechanical strength.

In the Valmet FI Patent No. 70,273, a press roll is described which has a surface layer composed of a mixture of metal powder and an inorganic substance. The function of the metal is to act as a binder agent and to increase the toughness of the roll coating. The function of the inorganic substance is to provide a wear-resistant face of suitable surface energy, because the surface energy of the roll face must be within certain limits in order that the detaching of the paper web from the face of the press roll can be controlled.

In a roll in accordance with the Valmet FI Patent Appl. No. 853544, a suitable surface energy has provided wherein that the metal component is stainless steel containing chromium, the proportion of chromium in the metal being 9–35%. A stainless steel that contains an abundance of chromium is a hydrophilic material (chromium increases the hydrophilicity). On the other hand, by means of the alloying of chromium, wear-resistant chromium carbides were obtained in the structure. Chromium also increases the resistance of steel to corrosion. In such an "alloy", the ceramic material is separated from the steel itself as a chromium carbide.

SUMMARY OF THE INVENTION

Accordingly, it is an object of the present invention to provide a roll and a method for manufacturing the same, by means of which the detaching of a paper web from the roll face is controlled, and the resistance of the roll to temperature and to mechanical strains is improved.

These and other objects are attained by the present invention which is directed to a roll for directly contacting a web and from which the web is detached, comprising a coating formed onto a mantle of this roll, this coating being partially formed of metal and also including a ceramic material. An outer face of the coating is formed of carbide-rich areas and of matrix areas formed between said carbide-rich areas.

The outer face of the coating preferably consists of said carbide-rich and matrix areas, with the roll preferably being used in the manufacture of paper, e.g. being a central roll in a press or a calender roll.

The present invention is also directed to a method for manufacturing a roll for directly contacting a web and from which the web is detached, comprising the steps of providing the roll with a coating formed partially of metal and including a ceramic material, and forming the coating from a powder which contains carbide-rich powder and matrix powder.

Therefore, in view of achieving the objects noted above and those which will become apparent below, a roll in accordance with the present invention is principally characterized by an outer face of a coating thereof consisting of carbide-rich areas and of matrix areas situated between the carbide-rich areas. On the other hand, the method in accordance with the present invention for achievement of the above-noted objectives, and those which will become apparent below, is principally characterized by the coating being made of a powder which consists of carbide-rich powder and matrix powder.

When applying the method of the present invention, it is possible to use roll frames manufactured by means of a prior-art casting technique, together with the ends and axle journals thereof. This roll frame primarily provides for the mechanical strength of the roll, whereas the surface properties of the roll and the durability of the roll face are achieved in a novel manner.

The roll in accordance with the present invention can be manufactured by means of a number of different methods, which, e.g., are described in FI Patent No. 70,273 and in FI Patent Appl. 853544.

The function of the carbide coating is, in particular, to act as a press face of the roll, whose specific feature is good properties of detaching of the paper web.

The detaching properties are based on the properties of the carbide coating, which are microporosity, low friction, suitable roughness of the surface, and retention of these properties.

BRIEF DESCRIPTION OF THE DRAWINGS

The present invention will be described in greater detail with reference to certain exemplary embodiments thereof, and also to the accompanying drawing, which is a comparison of performance of a roll manufactured in accordance with the present invention, with other different rolls.

DESCRIPTION OF THE PREFERRED EMBODIMENTS

Figure 1:
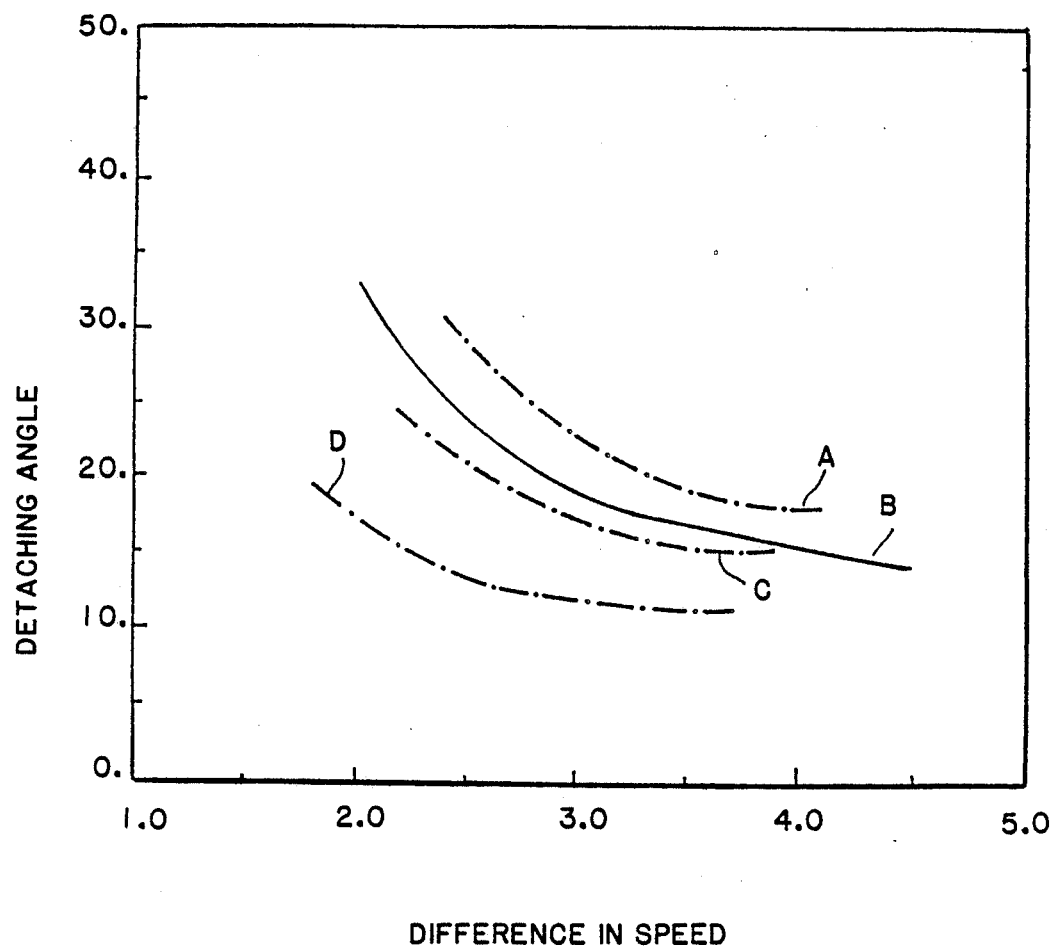

The morphology, chemical composition, and other properties of the coating in accordance with the present invention will be described in greater detail below.

The roll coating in accordance with the present invention consists of carbide-rich areas whose diameter is about 10–50 microns, as well as of matrix areas situated between the carbide-rich areas and whose diameter is about 10–50 microns. In the carbide areas, the size of the carbides is about 0.5–10 microns, and the proportion of the carbides is about 50–95%. Carbides also occur in the matrix area, but the carbides are of submicroscopic size of about 0.001–0.01 microns, and the proportion thereof varies within the range of about 5-50 vol. percent. Some of the carbides are still unseparated, and the carbon reinforces the matrix by means of a solution-reinforcement mechanism.

The proportion of the carbide areas varies in accordance with the purpose of use. When the proportion is low, about 5-20 volume percent, the coating is softer and tougher than when the proportion is high, e.g. about 70-95 volume percent, in which latter case the abrasive wear resistance increases along with hardness and brittleness. For example, in the tungsten carbide face of a G-roll, the proportion of the carbide areas is approximately 20-30 volume percent.

Chemically, the roll coating is a mixture of tungsten, chromium, carbon, and optionally cobalt, or a mixture of tungsten carbide, tungsten, cobalt, chromium, and carbon. The percentage of the constituents in the composition are, in the matrix area, of an order of about 70-85 weight percent tungsten, preferably about 80 or 81 weight percent tungsten, about 7-13 weight percent cobalt, preferably about 10 weight percent cobalt, about 4-10 weight percent chromium, preferably about 4 or 4-5 weight percent chromium, and about 4-8 weight percent carbon, preferably about 4-5 or 5 weight percent carbon.

In the carbide-rich area, the percentages of the constituents in the composition are of an order of about 70-89 weight percent tungsten carbide, preferably about 85% or about 86% by weight tungsten carbide, about 7-13 weight percent cobalt, preferably about 10 weight percent cobalt, about 4-10 weight percent or about 4-8 weight percent chromium, and preferably about 4-5 percent by weight or about 5% or 4% by weight chromium. The composition of the tungsten carbides consists of different carbides, whose percentages are of an order of about 30-100% WC, preferably about 50% WC, about 0-50% $WC_{1-x}$, preferably about 40% $WC_{1-x}$, about 0-30% $W_2C$, and preferably about 10% $W_2C$. In the matrix area, the composition corresponds to the average composition, but part of the carbon is bound in submicroscopic carbides and part of the carbon is dissolved in the metal matrix.

The roughness of the surface is regulated by means of the porosity of the face, size of the carbides, and by means of the degree of finish-grinding. The porosity is affected by means of the coating parameters. With increased porosity, the surface roughness is also increased. The size of the carbides is mainly determined by the size of the carbides in the powder of which the coating is formed.

By means of the coating parameters, the carbide size can be reduced only by a small amount. With an increasing carbide size, the surface roughness is also increased. The surface roughness is affected by means of the finished-grinding, by grinding off the peaks of carbides present in the surface, and thereby the surface roughness is also reduced at the same time, while any macroscopic unevenness is ground off also at the same time. The roughness of the surface that is deserved depends upon the purpose of use. When increased friction and detaching properties are desired, a higher surface roughness is chosen, e.g. $R_a$ about 1-2 microns, and when it is desired to emphasize low friction and low abrading quality, the surface roughness is, e.g., $R_a$ about 0.2-1 microns.

The hardness of the coating is higher than about 1000 HV 300, and its internal strength is higher than about 100 $N/mm^2$.

The coating of the roll in accordance with the present invention is made of a powder, whose properties will be described in detail below.

The powder consists of a carbide-rich powder and of a matrix powder. The particle size in the powder is about 5-50 microns, and the distribution depends on the method and is, for example: < about 45 microns about 99%, < about 20 microns about 20%, and < about 15 microns about 7%.

The shorter the time of subjecting the powder to heat or the lower the coating temperature, the smaller the particle sizes. The powder must, however, be sufficiently large-sized in order that it can be fed in the coating device. Moreover, the surface area of the particles has influence; the larger the area, the more efficient is the heating. The size of the carbides present in the powder particles varies in accordance with the purpose of use, being about 1-10 microns, depending upon the requirement of roughness. A carbide size of about 1 micron corresponds to a surface roughness of about 0.5 micron $R_a$, and a carbide size of about 3 micron corresponds to a surface roughness of about 1.5 micron $R_a$. The matrix powder has been made of a melt by means of a rapid solidification (rapid solidification technique), so that the carbon remains in the structure as submicroscopic carbides and/or as dissolved in the metal matrix.

The shape of the carbide particles in the coating and in the powder is substantially round. The chemical composition of the powder corresponds to the composition of the coating. The matrix may be crystalline, amorphous, or a mixture of the structures of a crystalline and an amorphous substance.

The powder (matrix powder) is manufactured, e.g., by means of the technique of milling-sintering and crushing. The coating is carried out by means of methods known in the prior art, e.g. band welding, by thermal spraying, casting, by winding a sintered and/or rolled band around a cylinder, or the roll coating is produced by using a flexible mat which is fixed to the roll frame by melting by using induction, laser, or any other suitable heating. These methods are described in detail in the Valmet FI Patent No. 70,273 and in the FI Patent Appln. 853544. When the coating is produced by spraying, it is carried out by spraying of two powder components, which are (a) carbide and binder material, and (b) matrix metal.

With respect to the properties of moistening and surface tension, the coating is close to the properties of granite, which has been traditionally used in the roll concerned.

The long term operating quality of the carbide coating is ensured by the high wear resistance produced by the high hardness (1100 HV) and by the good resistance to corrosion based upon the alloying. Both of these factors retain the microporosity and surface roughness, which are essential in view of the detaching of the web. The original level of microporosity can be regulated by means of the parameters of the coating process.

The carbide coating will also withstand the alterations predictable in future paper machine conditions, which are corrosion strain and higher temperatures, filler contents, and increasing linear loads. The coating will also endure situations of thermal shock.

Moreover, the invention will be illustrated by means of the following examples and the accompanying figure.

On the basis of trial runs carried out in the Valmet test paper machine, with the carbide coating, small detaching angles and low detaching forces were ascertained compared with other test faces.

The FIGURE illustrates the web detaching angle as a function of the difference in speed between the web and the roll at a paper machine running speed of 18 m/s.

EXAMPLES

In the test machine, trial runs were carried out with the following rolls:
1. A Old rock roll
2. B Metal roll
3. C Conventional Polymer Roll
4. D Roll in accordance with the invention at a paper machine running speed of 18 m/s. In the FIGURE, the results are recorded as web detaching angles as a function of the difference in speed between the web and the roll. From the FIGURE, it is seen that the carbide coating D has the best detaching properties, because with a certain tensile force, the web detaching point is early (small detaching angle). In connection with the trial runs, the relative detaching work was also measured. The results can be seen in table 1 below. The detaching work with the carbide coating D is only about 40% of the detaching work of the reference roll A.

TABLE 1

Value $W_s$ of relative detaching work with different rolls:

Theory: $T = \frac{W}{1 - \cos\phi} + mv^2$

As reference is obtained: $\frac{W_{sa}}{1 - \cos\phi_a} = \frac{W_{sb}}{1 - \cos\phi_b}$ Values of W based on results of trial runs:

| Roll | W |
| --- | --- |
| A | 1 |
| B | 0.64 |
| D | 0.41 |

The preceding description of the present invention is merely exemplary, and is not intended to limit the scope thereof in any way.

What is claimed is:

1. A roll for directly contacting a web and from which the web is detached, comprising
a coating formed onto a mantle of said roll,
said coating partially formed of metal and also including a ceramic material,
wherein an outer face of said coating is formed of carbide-rich areas composed of metal and ceramic and of metallic matrix areas formed between said carbide-rich areas and
which is used in the manufacture of paper.

2. The roll of claim 1, wherein the roll is a central roll in a press or a calender roll.

3. The roll of claim 1, wherein hardness of said coating is higher than about 100 HV 300, and internal strength of said coating is higher than about 100 N/mm².

4. A roll for directly contacting a web and from which the web is detached, comprising
a coating formed onto a mantle of said roll,
said coating partially formed of metal and also including a ceramic material,
wherein an outer face of said coating is formed of carbide-rich areas composed of metal and ceramic and of metallic matrix areas formed between said carbide-rich areas and
wherein diameter of said carbide rich areas is about 10 to 50 microns and diameter of said matrix areas is about 10 to 50 microns.

5. A roll for directly contacting a web and from which the web is detached, comprising
a coating formed onto a mantle of said roll,
said coating partially formed of metal and also including a ceramic material,
wherein an outer face of said coating is formed of carbide-rich areas composed of metal and ceramic and of metallic matrix areas formed between said carbide-rich areas and
wherein in said carbide rich areas, size of carbides is about 0.5 to 10 microns and proportion of said carbides is about 50 to 95%.

6. A roll for directly contacting a web and from which the web is detached, comprising
a coating formed onto a mantle of said roll,
said coating partially formed of metal and also including a ceramic material,
wherein an outer face of said coating is formed of carbide-rich areas composed of metal and ceramic and of metallic matrix areas formed between said carbide-rich areas and
wherein, in said matrix areas, size of carbides is about 0.001 to 0.01 microns and proportion of said carbides is within the range of about 5 to 50%.

7. The roll of claim 6, wherein in said coating, some of said carbides are unseparated and carbon reinforces said matrix by means of a solution reinforcement mechanism.

8. A roll for directly contacting a web and from which the web is detached, comprising
a coating formed onto a mantle of said roll,
said coating partially formed of metal and also including a ceramic material,
wherein an outer face of said coating is formed of carbide-rich areas composed of metal and ceramic and of metallic matrix areas formed between said carbide-rich areas and
wherein, said coating is chemically a mixture of tungsten carbide, tungsten, cobalt, chromium, and carbon.

9. A roll for directly contacting a web and from which the web is detached, comprising
a coating formed onto a mantle of said roll,
said coating partially formed of metal and also including a ceramic material,
wherein an outer face of said coating is formed of carbide-rich areas composed of metal and ceramic and of metallic matrix areas formed between said carbide-rich areas and
wherein, said coating is chemically a mixture of tungsten, cobalt, chromium, and carbon.

10. The roll of claim 9, wherein, in said matrix areas, proportion of constituents is of the order of about 70-85% by weight tungsten, about 7-13% by weight cobalt, about 4-10% by weight chromium, and about 4-8% by weight carbon.

11. The roll of claim 10, wherein the proportion is of the order of about 80% tungsten, about 10% cobalt, about 4-5% chromium, and about 5% carbon.

12. The roll of claim 9, wherein composition of said carbide-rich areas is substantially about 70-89% by weight of tungsten carbide, about 7-13% by weight of cobalt, and about 4-10% by weight of chromium.

13. The roll of claim 12, wherein said composition is about 85% by weight of tungsten carbide, about 10% by weight of cobalt, and about 4–5% by weight of chromium.

14. The roll of claim 13, wherein proportion of different carbides in said tungsten carbide is about 30–100% of WC, about 0–50% of $WC_{1-x}$, and about 0–30% of $W_2C$.

15. The roll of claim 14, wherein the proportion of the different carbides is about 50% WC, about 40% $WC_{1-x}$, and about 10% $W_2C$.

16. The roll of claim 14, wherein in said matrix areas, part of carbon is bound in submicroscopic carbides, and part of said carbon is dissolved in a metal matrix.

* * * * *